Sept. 4, 1973 S. C. ROONEY 3,756,912
CONVEYOR MECHANISM FOR TRANSFERRING PAPER WEB
Filed Dec. 31, 1970 2 Sheets-Sheet 1
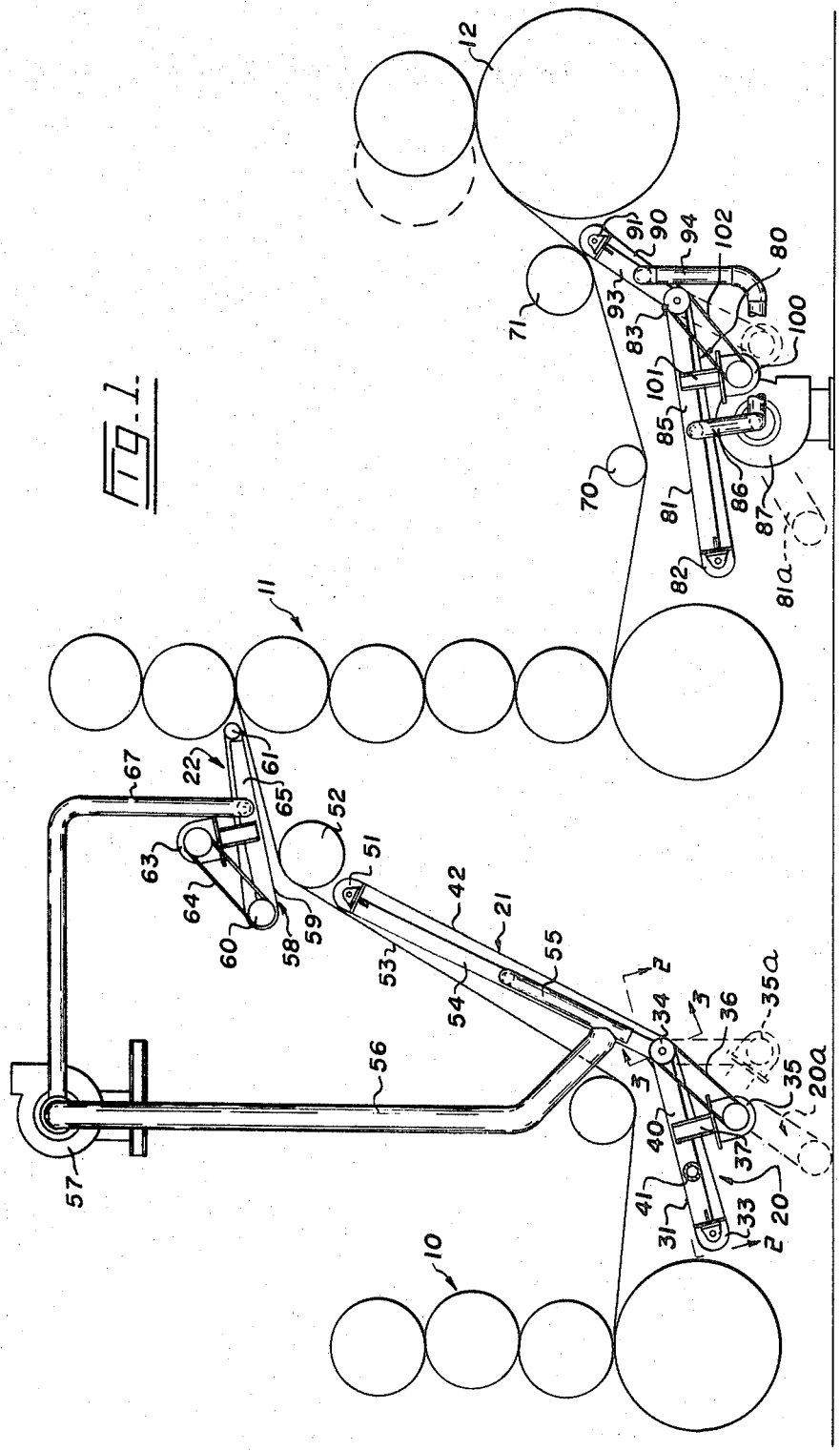
INVENTOR
SIDNEY C. ROONEY
BY
Fetherstonhaugh & Co.
ATTORNEYS INVENTOR
SIDNEY C. ROONEY
BY
*Featherstonhaugh & Co.*
ATTORNEYS

United States Patent Office 3,756,912
Patented Sept. 4, 1973

3,756,912
CONVEYOR MECHANISM FOR TRANSFERRING PAPER WEB
Sidney C. Rooney, Vancouver, British Columbia, Canada, assignor to Durand Machine Company Ltd., New Westminster, British Columbia, Canada
Filed Dec. 31, 1970, Ser. No. 103,035
Int. Cl. D21f 1/36
U.S. Cl. 162—255                    3 Claims

ABSTRACT OF THE DISCLOSURE

In or for a paper making or processing machine a conveyor for transporting a paper tail between rollers of the drier and a calender, between adjacent calenders or between a calender and a reel drum. The conveyor is formed of a plurality of endless cords extending around grooved rollers, and comprises a suction box located between transport and return courses of the conveyor and is open to the transport course to support a paper tail on that course.

---

Figure 4:
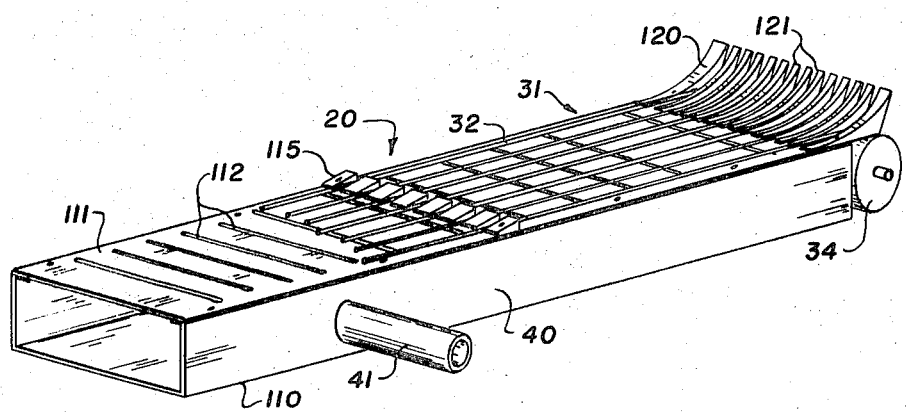

This invention is concerned with paper making or processing machinery and particularly with apparatus for conveying a paper tail or lead strip between the drier and a calender stack or between two calender stacks or between a calender stack and a reel drum.

An apparatus of the general kind with which this invention is concerned and one which is particularly suited for a paper making machine is described in Canadian Pat. 732,864 issued Apr. 26, 1966 to A.G. Devlin.

The apparatus described in that patent specification comprises an air pervious conveyor belt extending between the drier and a calender and having a vacuum chest locating between the upper and lower runs of the belt and acting to hold the paper tail to the belt as it is conveyed from the drier and into the calender stack. At the calender end of the conveyor the paper tail is lifted from the belt by an air blast to be passed into the nip of the upper rolls of the calender.

The Devlin arrangement has proved to be a considerable improvement over what has preceded it but it does have certain disadvantages.

One is the difficulty in the maintenance of the belt and in particular its replacement where the joining of the ends of the strip making up the endless belt is time consuming and costly. Additionally it is difficult to obtain accurate tracking of the belt over the conveyor rolls, particularly at the high speeds at which the conveyor is required to transfer the paper tail.

Another disadvantage is that it is commonly required to have two or even more conveyors between the dryers and the said calender stack or between adjacent calender stacks, to overcome an obstruction. This has meant that there must be some provision for passing the tail from the end of one conveyor to the beginning of the next conveyor such as for example an air blast.

The present invention seeks to overcome this disadvantage by substituting for the belt a plurality of spaced endless cords. Preferably the cords are of a plastics material so that the ends of the cords may be firmly joined by either an adhesive or, and more desirably, by welding. With this arrangement the maintenance of the conveyor is much simpler and the conveyor is more durable.

To properly guide the cords it is desirable that they be trained in individual grooves formed in the end rolls of the conveyor and this means that the cords of adjacent conveyors can be trained over a common pulley, the cords of one conveyor being trained in grooves between the grooves of adjacent pair of cords of the other conveyor. In this way one is able to do away in some instances with the need to bridge the gap between adjacent conveyors as is the case using a full width textile belt.

Additionally, to ensure that the paper tail leaves the upper end of the conveyor cleanly to be presented to the calender, it is possible and generally desirable to provide guide means at the upper end of the conveyor projecting between the cords of the conveyor and into the path of the tail. Alternatively the momentum of the paper in some instances may be sufficient to cause the tail reliably to be fed to the calender.

Figure 2:
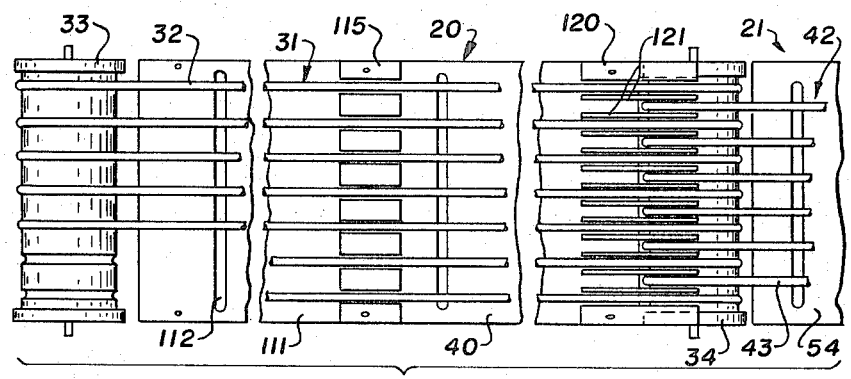
Figure 3:
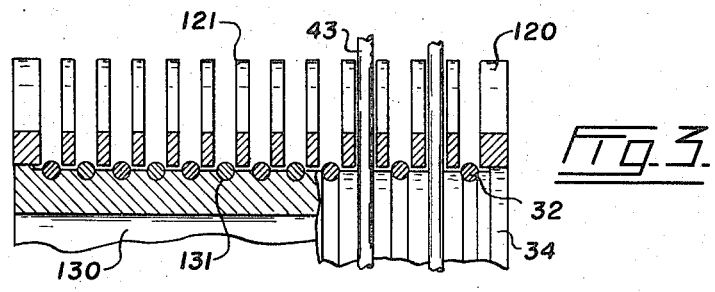

An embodiment of this invention is illustrated, schematically, in the accompanying drawings in which, FIG. 1 is a side elevation of tail conveying apparatus in accordance with this invention incorporated in paper making machinery, FIG. 2 is an enlarged fragmentary section taken on the line 2—2 of FIG. 1, FIG. 3 is an enlarged section on the line 3—3 of FIG. 1, and FIG. 4 is a perspective view of a part of the tail conveying apparatus of FIG. 1.

The apparatus in FIG. 1 is especially adapted for conveying a paper tail from the bottom of a first calender stack 10 to the upper rolls of a second calender stack 11 and between the bottom of the calender stack 11 and the rewind drum 12. Clearly apparatus of this invention could be located between the drier, not shown, of the paper making apparatus and the first calender stack.

In the illustrated paper making machinery there are a first conveyor section 20, a second conveyor section 21 and a third conveyor section 22, each in accordance with this invention.

The first conveyor section 20 comprises a conveyor 31 made up of a plurality of laterally-spaced cords 32 trained around grooved rollers 33 and 34 so as to define a transport course and a return course. The end roller 34 is driven by a motor 35 through a belt drive 36 in conventional fashion. The motor is mounted upon a supporting frame 37 which is secured to and is movable with, the conveyor. The conveyor 20 is pivotable about the axis of roller 34, which is common to the lower end of conveyor 21, between the position shown in full line in FIG. 1 and the position indicated in dotted line at 20a in that figure. The pivotting movement may be effected for example by a pneumatic piston and cylinder device not shown. It will be appreciated that the motor, being connected to the conveyor will move as the conveyor moves to adopt the position indicated at 35a in dotted line in FIG. 1.

Located between the upper (transport) and lower (return) courses of the conveyor 31 is a vacuum chest 40 which is illustrated in FIG. 2 and described in detail hereinafter. Air is exhausted from the vacuum chest through ducting 41 which is connected to the low pressure side of a fan (not illustrated).

The second conveyor section 21 is made up of a conveyor 42 formed by a plurality of laterally-spaced cords 43 in similar fashion to that of the conveyor 31. The cords 43 are trained around the end roller 34, which is common to both conveyor 20 and 21, and around upper end roller 51 similarly to define transport and return courses.

The upper end rollers 51 of the conveyor 21 is located close to a guide roller 52 which guides the paper web 53 during the normal running of the paper making machine. Located between the upper (transport) and lower (return) courses of the conveyor 42 is a vacuum chest 54 from which air is exhausted through ducting 55, 56 which is connected to the low pressure side of a fan 57. The vacuum chest 55 is of generally similar construction to that of vacuum chest 40.

Located above the upper end of the conveyor section 21 is the third conveyor section 22 which is inverted relative to the others and comprises a conveyor 58 made up of a plurality of spaced cords 59 trained around end rolls 60 and 61 which are grooved to receive said cords. The conveyor section 22 is driven by motor 63 through belt drive 64 mounted on the conveyor structure. Located between the upper (return) and lower (transport) courses of the conveyor section 22 is a vacuum chest 65 arranged to support the paper tail on the lower course and of generally similar construction to chest 40. The vacuum chest is evacuated through ducting 67 which is connected to the low pressure side of the fan 57.

As the paper web 53 issues from the lower end of the calender stack 11 it is during the normal running of the paper machine guided over rolls 70 and 71 to the rewind drum 12, and to re-establish the connection between the lower end of the calender stack 11 and the reel 12 in the event of a breakage of the web there is provided the re-threading apparatus generally indicated at 80 and which is substantially the same as conveyor section 20. Apparatus 80 comprises a first conveyor 81 made up of spaced cords trained around grooved end rollers 82 and 83 and having a vacuum chest 85, which is exhausted through ducting 86, connected to the low pressure side of a fan 87. The end roller 83 is common to conveyor 81 and to a conveyor 90 which is made up of spaced cords trained around the common end roller 83 and an upper end roller 91. The conveyor 90 has a vacuum chest 93 connected through ducting 94 to the low pressure side of the fan 87.

As with the conveyor 20 between the stacks 10 and 11, the conveyor 81 is pivotable about its connection to the lower end of conveyor 90 to be movable between the positions shown in full line in FIG. 1 and the position indication at 81a in dotted line in that figure.

The motor drive for the conveyors 81 and 90 comprises a motor 100 secured by a frame 101 to be movable with the conveyor 81 and driving the common roll 83 through a belt 102. The motor moves with the conveyor 81 when the latter is swung between the position shown in full dot line in FIG. 1 and the position indicated at 81a in dotted lines.

Each of the vacuum chests of the conveyors described above is of generally similar construction to that of chest 40 illustrated in FIG. 4. Chest 40 comprises a generally trough shaped base 110 to upper edges of the side walls of which is secured a closure plate 111 throughout the length of which are formed transverse slots 112. At intervals along the length of the chest there are secured cord constraining members 115 which project between and guide the individual cords 32 which make up the conveyor 31. At the end of the chest 40 which is preferably located at any substantial change of direction of path of the paper tail, there is provided a paper tail lift-off guide in the form of a comb-like structure 120 which comprises a plurality of fingers 121 in the spaces between which the cords 32 are trained. Thus, the fingers 121 serve to guide the cords at the ends of the conveyor and also to lead the end of the paper tail from the top of the vacuum chest or cords and on to the adjacent conveyor 21. The different suction chests and their associated lift-off guides are located so as to direct paper tails on to next conveyors or from one conveyor into the nip of the next succeeding calender stack or to a rewind roll.

It is to be appreciated that the tail as it passes from the end of the conveyor 21 or from the end of conveyor 22 will have sufficient momentum, in the first case to reach the conveyor 22 and in the second case to reach the nip of the calender stack 11. Similarly the tail as it leaves conveyor 90 will have sufficient momentum to reach the reel 12.

Referring now to FIG. 3 it will be seen that the conveyor roller 34 which is common to two conveyors, in this case conveyors 20 and 21, comprises a drum 130 in the cylindrical surface of which are formed grooves 131. The cords 32 of one conveyor are trained in alternate ones of the grooves 131 and the cords 43 of the adjacent conveyor are trained in the remaining grooves of the drum. Fingers 121 of lift-off guide 120 project outwardly beyond the outer surfaces of these cords.

This arrangement enables but a single end roller to be used at the junction of two adjacent conveyors with the attendant saving in cost and additionally it does away with the need to provide some means by which the gap between conventional conveyors can be spanned.

Additionally the use of the cords working in grooves on the rolls of the conveyor eliminates the difficulties of tracking which occur at the rolls with a conventional belt. The cord constraining members 115 on the vacuum chest are located at the appropriate intervals properly to guide the cord intermediate to the grooved rolls.

I claim:

1. A conveyor assembly for feeding a paper tail from one drum to another drum or on any paper processing machine which must be threaded by transferring a paper tail as a first step, said assembly comprising an endless conveyor made up of a plurality of spaced endless cords trained around grooved end rollers so as to define a transport course upon which the tail is conveyed, and a return course, a vacuum chest located between the transport and return courses and opening towards the transport course for inducing a vacuum to retain a paper tail against said transport course during movement thereof, and a paper tail lift-off guide secured to the vacuum chest at the end of the transport course, said lift-off guide having at least one element projecting into the path of the paper tail between the cords of the belt to raise the tail from the end of the conveyor.

2. A conveyor assembly as claimed in claim 1, in which said paper tail lift-off guide comprises a comb-like structure having fingers which project through gaps between adjacent cords of the conveyor.

3. A conveyor assembly for feeding a paper tail between rotary elements of a paper processing machine said assembly comprising first and second conveyors each made up of a plurality of endless cords and having receiving and discharge ends, said first and second conveyors being arranged in end to end relationship with the discharge end of the first conveyor and the receiving end of the second conveyor being adjacent one another, first second and third grooved rollers receiving the endless cords, with the receiving end of the first conveyor and the discharge end of the second conveyor being trained around the first and third rollers respectively, and the cords of both conveyors being trained in alternate ones of grooves formed in the second roller which is common to both conveyors at their adjacent ends, each conveyor having a transport course and a return course and each having a vacuum chest located between the courses with an apertured surface disposed adjacent to the transport courses to hold a paper tail to that surface, at least the second conveyor having paper tail lift-off guide means secured to the vacuum chest and projecting between the cords of the belt and into the path of the tail at the discharge end to ensure separation of the tail from the conveyor and cord constraining members secured to the vacuum chest between the ends of each conveyor, and so as to project between and guide the travel of the cords.

References Cited

UNITED STATES PATENTS

| | | | |
|---|---|---|---|
| 3,355,349 | 11/1967 | Devlin | 162—193 X |
| 3,182,993 | 5/1965 | Haney et al. | 198—190 X |
| 1,842,889 | 1/1932 | Williams | 162—283 |
| 3,187,878 | 6/1965 | Harrison et al. | 198—190 X |
| 2,880,847 | 4/1959 | Kelley | 198—190 X |
| 2,987,988 | 6/1961 | Robledano | 198—190X |

S. LEON BASHORE, Primary Examiner

A. D'ANDREA, JR., Assistant Examiner

U.S. Cl. X.R.

100—173; 162—193; 198—190; 226—92